Aug. 9, 1932.    W. S. HAYFORD ET AL    1,871,321
FORMING TOOL
Filed May 10, 1930

INVENTORS W. S. HAYFORD
C. R. MOORE.
BY J. MacDonald
ATTORNEY

Patented Aug. 9, 1932

1,871,321

UNITED STATES PATENT OFFICE

WALTER S. HAYFORD, OF MORRISTOWN, AND CHARLES R. MOORE, OF MAPLEWOOD, NEW JERSEY, ASSIGNORS, BY MESNE ASSIGNMENTS, TO WESTERN ELECTRIC COMPANY, INCORPORATED, A CORPORATION OF NEW YORK

FORMING TOOL

Application filed May 10, 1930. Serial No. 451,335.

This invention relates to metal forming tools and particularly to a tool for use in the field for making joints in electrical conductors by forcing a sleeve into intimate contact with the conductor ends.

The object of this invention is the provision of a tool of this character which will be simple, efficient in operation and of a minimum weight.
In this forming tool the operation of a screw under control of a manually operable lever arm is effective to actuate a toggle mechanism for closing a forming die onto the sleeve for pressing it firmly on the abutting conductor ends. Means is provided in the die members for receiving sleeves of different diameters and for holding the die members in adjusted positions with respect to the toggle mechanism depending upon the diameter of the sleeve to be formed and means is provided for holding the tool in position on the sleeve against the force applied on the screw for forming the sleeve.

Figure 1:
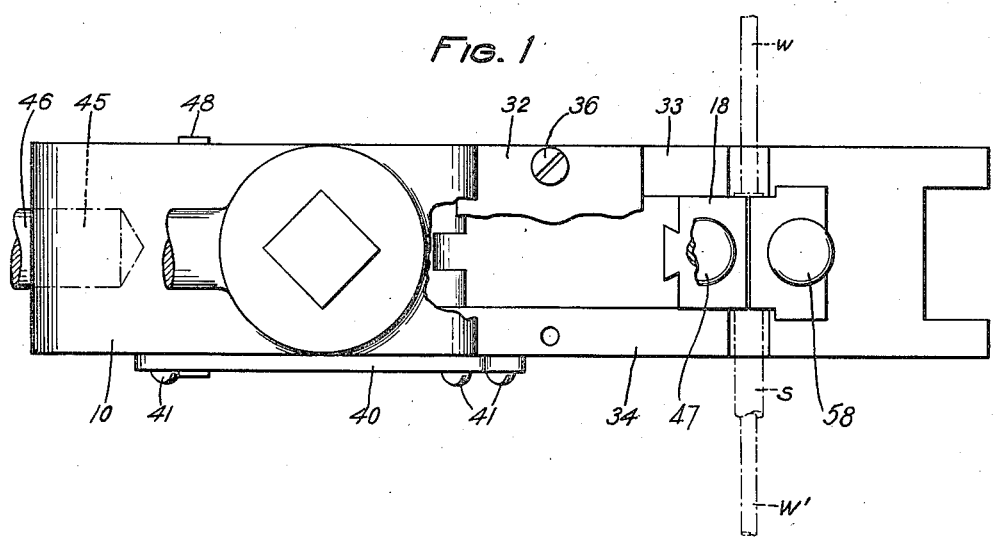
Figure 2:
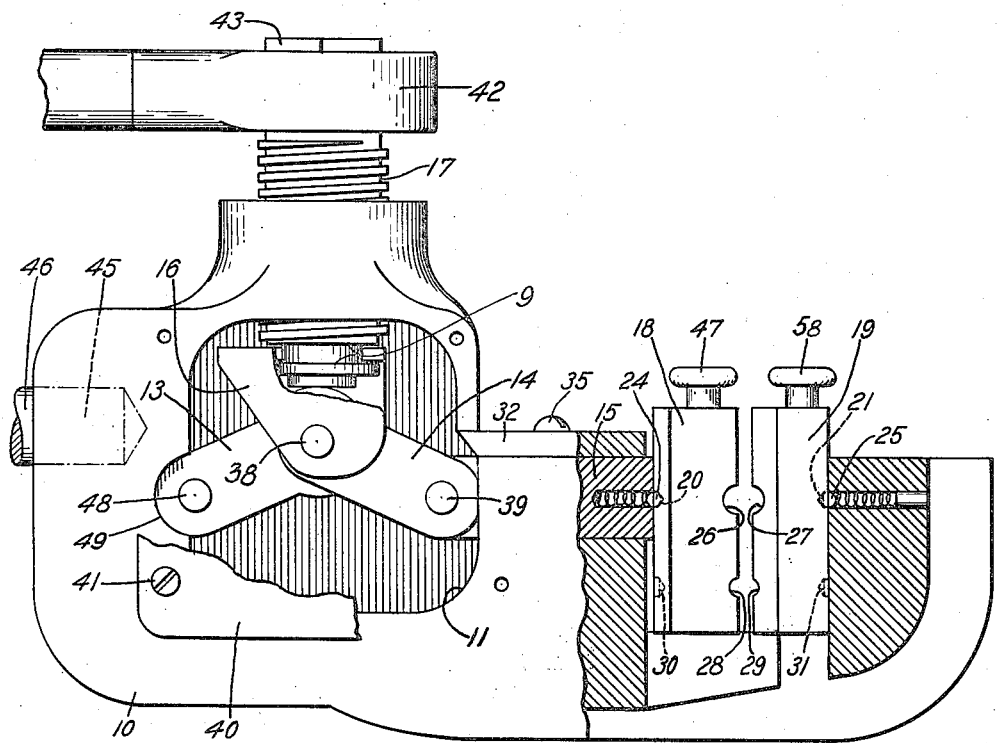

In the drawing, Fig. 1 is a top view of the tool showing diagrammatically a sleeve in position in the die and Fig. 2 is a side view of Fig. 1 showing a portion of the mounting block in section.

In the figures, 10 is a mounting block having a recessed portion 11 in which a toggle mechanism is mounted. This mechanism consists of levers 13 and 14, hinged on the pin 38 and a link 15 which is hinged on the pin 39 at the end of lever 14. A U-shaped yoke member 16 engages a collar 9 at the end of a screw 17 and the arms of this yoke engage the hinge pin 38 of levers 13 and 14. The yoke 16 is provided for retracting the toggle and the link 15 connected thereto upon the return movement of the screw 17. The toggle lever 13 is mounted on a pin 48 and its semicircular portion is disposed in abutment in a registering recess 49 in the mounting block 10 as shown in Fig. 2.
The link 15 is slidably mounted in the mounting block 10 and is guided therein by the ridges 33 and 34 and by a plate 32 in turn secured on the block by screws 35 and 36 shown in Figs. 1 and 2.
On the free end of link 15 is slidably mounted a die element 18 and on the end of the mounting block 10 is slidably mounted a die element 19 which cooperates with the die element 18 for forming sleeves on conductors in a manner that will be hereinafter described in detail.

The die elements 18 and 19 are each provided with recesses 20 and 21 which cooperate with the spring-pressed balls 24 and 25 for holding these die elements and the sleeve-forming portions 26 and 27 in coaxial alignment with the longitudinal axis of link member 15. The die elements 18 and 19 are provided at their lower ends with forming portions 28 and 29 and corresponding recesses 30 and 31 for holding them in coaxial alignment with the longitudinal axis of link 15 as above described in connection with the forming portions 26 and 27. The knobs 47 and 58 at the upper disposed ends of die members 18 and 19 are provided for easily moving these elements in the selected position with respect to the link 15 and the locating recesses 20, 30 and 21, 31 respectively.

A plate 40 which is held on the side of casting 10 by a number of screws such as 41 shown in Figs. 1 and 2, encloses the toggle mechanism and supports the pin 48 at the end of lever 13.

The toggle actuating screw 17 is provided with a square end portion 43 for engagement with the wrench 42 provided for actuating this screw in a well-known manner and the casting 10 is provided with a hole 45 for engagement with a bar 46 provided to assist in holding the tool in place against the force exerted on the wench 42 during the formation of the sleeve on the conductors.

In the forming operation the wires W—W' are placed in the sleeve S with the ends of the wires abutting each other. The sleeve S is then placed between the die members 18 and 19 with one of its ends just flush with the sides of the forming dies. The screw 17 is then rotated by the movement of the arm 42 and the toggle moved from its non-operated position as shown in Fig. 2 to the position wherein the die member 18 carried by the link 15 is forced against the sleeve S to its closed position as shown in Fig. 1 for pressing the sleeve firmly against the conductor W. The reverse movement of the screw 17 is effective to retract the die member 18 and disengage the formed portion of the sleeve from the die. The tool is then placed over the other end of the sleeve S and the operation repeated for pressing it against the conductor W' in the manner above described in connection with the first operation.

What is claimed is:

1. In a forming tool, a block, a toggle mechanism, a stationary die element mounted in said block, another die element disposed in operable relation with said mechanism, a screw, and means for actuating said screw for actuating said mechanism, for moving the last mentioned element toward said stationary element to swage a sleeve around conductor ends, the effective portions of said die elements cooperating to form a cylindrical opening of substantially uniform diameter.

2. In a device for forming sleeves on conductors to make joints, in combination a mounting block, a toggle mechanism having a rectilinear movable member, a stationary and a movable forming die, each die having a number of forming portions, and means for holding each die in selected position with respect to said member.

In witness whereof, we hereunto subscribe our names this 8th day of May, 1930.

WALTER S. HAYFORD.
CHARLES R. MOORE.